United States Patent
Maki

(10) Patent No.: US 8,014,391 B2
(45) Date of Patent: Sep. 6, 2011

(54) METHOD TO SET SETTING INFORMATION IN DEVICE AND DEVICE TO SET SETTING INFORMATION

(75) Inventor: Nobuhiko Maki, Shinagawa-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 11/444,621

(22) Filed: Jun. 1, 2006

(65) Prior Publication Data

US 2007/0005737 A1 Jan. 4, 2007

(30) Foreign Application Priority Data

Jun. 8, 2005 (JP) .................................. 2005-168501
May 2, 2006 (JP) .................................. 2006-128475

(51) Int. Cl.
*H04L 12/28* (2006.01)
(52) U.S. Cl. ....................................... 370/389; 709/242
(58) Field of Classification Search .................. 370/338, 370/389, 401; 709/242, 201, 246; 718/106
See application file for complete search history.

(56) References Cited

U.S. PATENT DOCUMENTS

| 7,092,984 | B2 * | 8/2006 | Nishigaya et al. | 709/201 |
| 2002/0176383 | A1 * | 11/2002 | Inoue et al. | 370/331 |
| 2002/0191576 | A1 * | 12/2002 | Inoue et al. | 370/338 |
| 2004/0010687 | A1 * | 1/2004 | Futa et al. | 713/168 |
| 2004/0063402 | A1 * | 4/2004 | Takeda et al. | 455/41.1 |
| 2005/0089034 | A1 * | 4/2005 | Sakata et al. | 370/389 |
| 2005/0090262 | A1 * | 4/2005 | Hamano et al. | 455/445 |
| 2005/0238029 | A1 * | 10/2005 | Yoneda et al. | 370/395.52 |

FOREIGN PATENT DOCUMENTS

JP         2003-333055 A         11/2003

* cited by examiner

*Primary Examiner* — Dang T Ton
*Assistant Examiner* — Wei Zhao
(74) *Attorney, Agent, or Firm* — Canon U.S.A., Inc., IP Division

(57) ABSTRACT

A device obtains network setting information by using a function for obtaining the network setting information used for network communication through a network. The device receives from an apparatus for transmitting setting information to be set in a device to the device, setting information containing information to stop using the function to set the received setting information in the device.

4 Claims, 4 Drawing Sheets

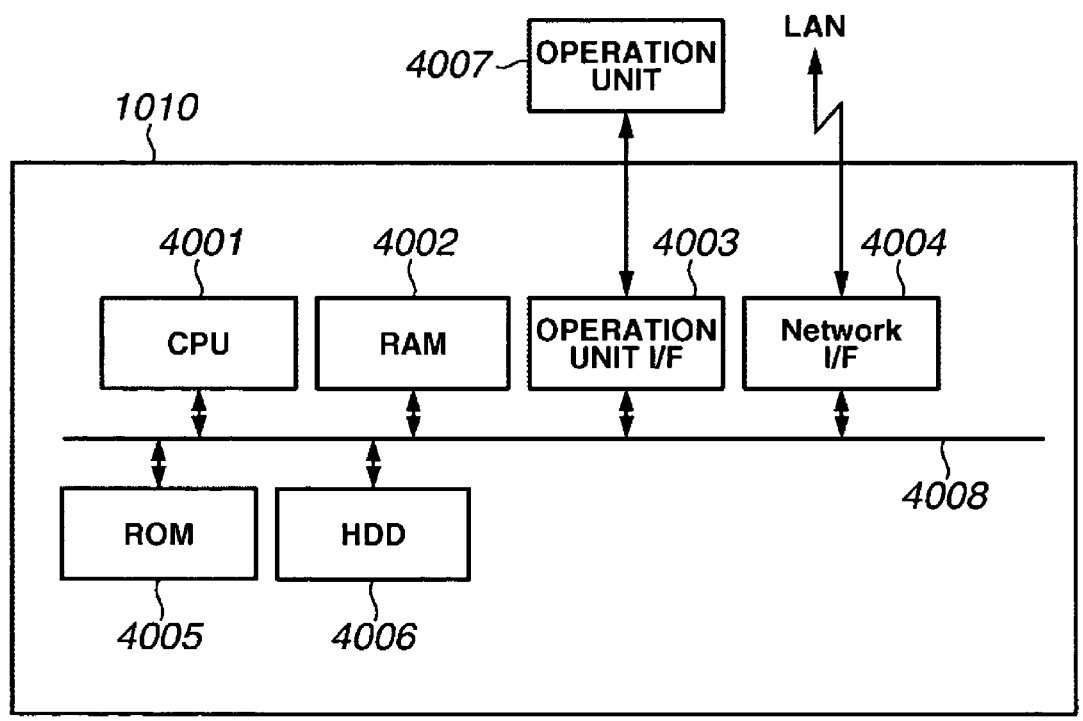

METHOD TO SET SETTING INFORMATION IN DEVICE AND DEVICE TO SET SETTING INFORMATION

BACKGROUND OF THE INVENTION

1. Field of the Invention

The present invention relates to a method to set setting information in a device, and a device to set setting information.

2. Description of the Related Art

Typically, when a device is added to a network and installed, a user must set setting information used for network communication such as IP addresses. To eliminate such a cumbersome operation, there has been proposed a technology for automatically obtaining an IP address or the like by using a dynamic host configuration protocol (DHCP) or the like, and setting the IP address in a device (e.g., JP A 2003-333055).

In the case of the technology that uses the DHCP or the like, however, there is a possibility that a different IP address will be assigned to the device each time the device obtains the IP address. Use of this technology has been unsuitable for a device where server system services are operated because, if the IP address is changed each time, a client cannot access the server unless he knows an IP address assigned after a change. On the other hand, if the device does not use the DHCP or the like at all, the device cannot obtain a proper IP address, and may not be able to perform network communication thereafter.

Moreover, when the device is installed, a variety of setting information must be set in addition to the IP address. Accordingly, a setting information transmitter may be used to periodically transmit setting information to the device. However, when the IP address is occasionally changed, there is a risk that the setting information transmitter will not be able to properly transmit the setting information to the device.

SUMMARY OF THE INVENTION

The present invention is directed to efficiently set setting information to be set in a new device when the device is connected to a network.

According to an aspect of the present invention, a system including an apparatus in communication with a device via a network is provided. The system further includes the apparatus including a setting information transmission unit configured to transmit setting information to the device to be set in the device; and the device including, a network setting information obtaining unit configured to obtain network setting information by using a function for obtaining the network setting information used for network communication through the network; a setting information reception unit configured to receive from the apparatus the setting information containing information to stop using the function; and a setting information setting unit configured to set the setting information received by the setting information reception unit in the device.

According to an aspect of the present invention, the apparatus further includes a storage unit configured to store an address list indicating a destination address of the setting information; a request reception unit configured to receive a request of the setting information from the device; and an addition unit configured to add the device which requests the setting information to the address list, wherein the setting information transmission unit transmits the setting information to the destination address indicated by the address list.

Additionally, in another aspect of the present embodiment, the function may be a DHCP function which performs address allocation.

According to another aspect of the present invention, the apparatus periodically transmits setting information which does not contain network setting information or the information to stop using the function after the setting information containing information to stop using the function has been received and set by the device. Still further, according to another aspect of the present invention, the setting information reception unit receives setting information which contains new network setting information used for network communication and the information to stop using the function. Moreover, according to another aspect of the present invention, the network setting information is an address in the network.

According to another aspect of the present invention, a method is provided to set setting information in a device. The method includes obtaining network setting information by using a function for obtaining the network information used for network communication through a network; receiving setting information containing information to stop using the function from an apparatus for transmitting setting information to be set in the device; and setting the received setting information received in the device. And, according to an aspect of the present embodiment, the function may be a DHCP function which performs address allocation.

According to still another aspect of the present invention, a computer readable medium containing computer-executable instructions for causing a device to set setting information in the device is provided. The computer readable medium includes computer-executable instructions for obtaining network setting information by using a function for obtaining the network information used for network communication through a network; computer-executable instructions for receiving setting information containing information to stop using the function from an apparatus which transmits the setting information to be set in the device; and computer-executable instructions for setting the received setting information in the device. Also, according to an aspect of the present embodiment, the function may be a DHCP function which performs address allocation.

Moreover, according to yet another aspect of the present invention, a device configured to receive and set setting information within the device, the setting information being transmitted from another apparatus. The device includes the device includes a network setting information obtaining unit configured to obtain network setting information by using a function for obtaining the network setting information used for network communication through the network; a setting information reception unit configured to receive from the apparatus the setting information containing information to stop using the function; and a setting information setting unit configured to set the setting information received by the setting information reception unit in the device. And, according to an aspect of the present embodiment, the function may be a DHCP function which performs address allocation.

According to still yet another aspect of the present invention, an apparatus is provided which is configured to transmit setting information to a device to be set in the device. The apparatus include a storage unit configured to store an address list indicating a destination address of the setting information; a request reception unit configured to receive a request of the setting information from the device; an addition unit configured to add the device which requests the setting information to the address list; and a setting information transmission unit configured to transmit the setting information containing information to stop using a function for obtaining network setting information used for network communication through a network, to the device which requests the setting information. Also, according to an aspect of the present embodiment, the function may be a DHCP function which performs address allocation.

BRIEF DESCRIPTION OF THE DRAWINGS

The accompanying drawings, which are incorporated in and constitute a part of the specification, illustrate exemplary numerous embodiments, features and aspects of the invention and, together with the description serve to explain the principles of the invention.

FIG. 4 is a hardware block diagram of an exemplary setting information distribution device, according to an aspect of the present invention.

DETAILED DESCRIPTION OF THE EXEMPLARY EMBODIMENTS

Exemplary embodiments, features and aspects of the present invention will now herein be described in detail below in accordance with the accompanying drawings.

Figure 1:
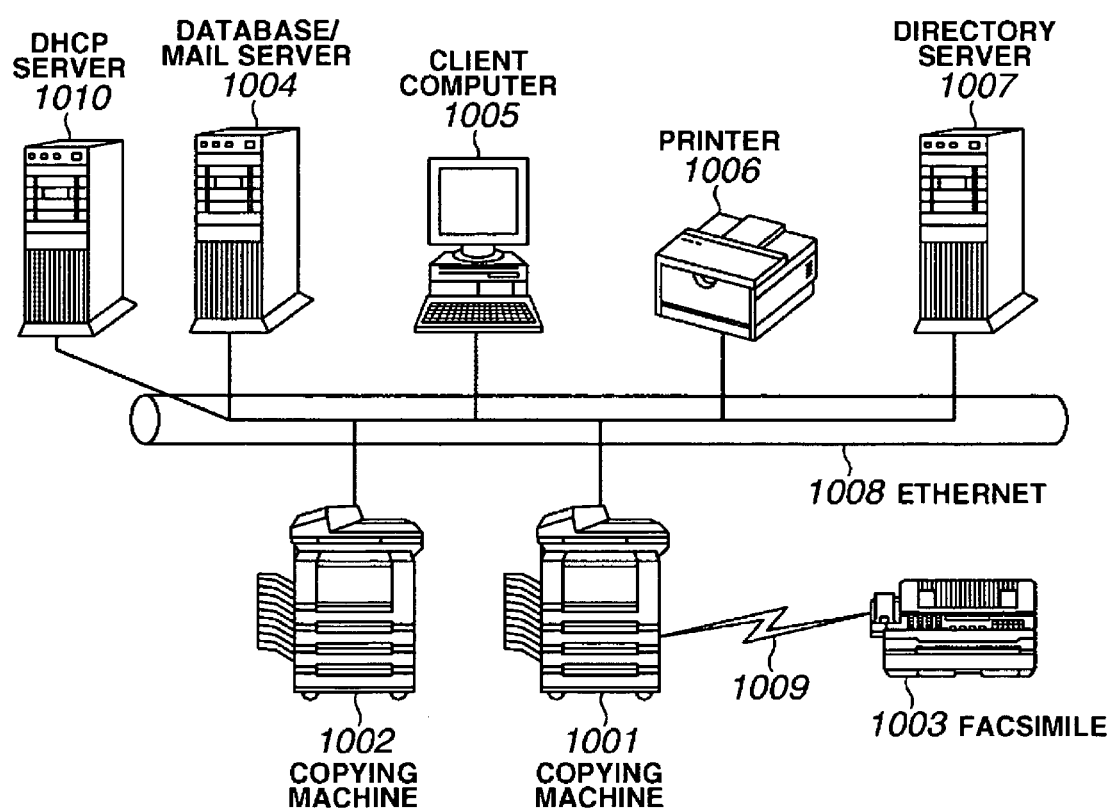
FIG. 1 is a diagram showing a configuration of a system according to an exemplary embodiment of the present invention.

FIG. 1 is a diagram showing a configuration of a system according to an exemplary embodiment of the present invention. A copying machine 1001 or 1002 reads a document, and prints or transmits image data of the read document to various devices. A facsimile 1003 receives the image data generated by the copying machine 1001 through a public line 1009 to print it. A database/mail server 1004 is a computer in which an application server for storing the image data transmitted from the copying machine 1001 or 1002 operates. A client computer 1005 is a computer connected to the database/mail server 1004 to download and display data stored therein. A printer 1006 prints the image data generated by the copying machine 1001 or 1002, or page description language (PDL) data generated by the client computer 1005.

A directory server 1007 is an information management device for storing various pieces of directory information such as a name of a user, an electronic mail address, and a facsimile number. The copying machines 1001 and 1002 and the client computer 1005 can access the directory information by a protocol such as a lightweight directory access protocol. A DHCP server 1010 assigns an IP address to a device of a network by using a dynamic host configuration protocol (DHCP).

Ethernet (registered trademark) 1008, for example, is a network to which the copying machines 1001 and 1002, the database/mail server 1004, the client computer 1005, the printer 1006, the directory server 1007, the DHCP server 1010 and the like are connected.

The exemplary embodiment will be described by way of an example where the database/mail server 1004 transmits setting information to the copying machine 1001 or 1002 using the Ethernet (registered trademark) 1008. The database/mail server 1004 distributes the setting information to the device of the network, serving as a setting information distribution device. However, for example, the copying machine 1001 may serve as a distribution source of the setting information to transmit it to the copying machine 1002 or the like. The embodiment shows an example using the Ethernet (registered trademark) 1008 as a connection medium between devices. However, the network is not limited to the Ethernet (registered trademark) 1008. It is further noted that any network can be used as long as it enables bidirectional (data) communication between the devices.

Further it is noted that the protocol used for data transmission/reception between the devices on the connection medium can be an existing protocol such as a hyper text transfer protocol (HTTP), a simple object access protocol (SOAP), or a file transfer protocol (FTP), or an completely independent application protocol.

Figure 2:
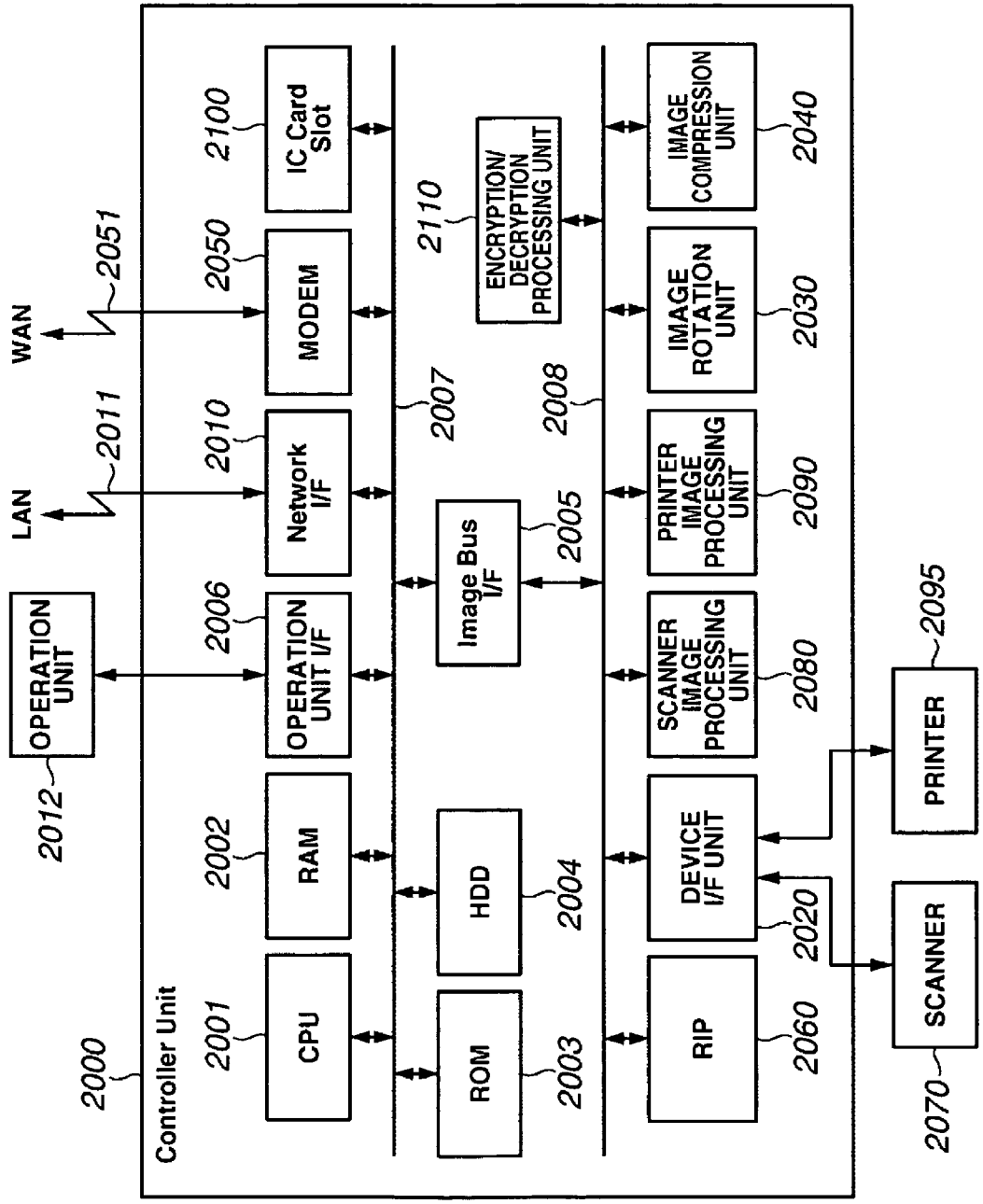
FIG. 2 is a hardware block diagram of an exemplary copying machine.

FIG. 2 shows an exemplary hardware configuration of the copying machine 1001 or 1002. A controller unit 2000 is connected to a scanner 2070 which is an image input device and a printer 2095 which is an image output device, as well as to a LAN 2011 and a public line (WAN) 2051 to input/output image data or setting information.

A CPU 2001 is a controller for controlling the copying machine. A RAM 2002 is a work memory used for temporarily storing image data when the CPU 2001 operates. A ROM 2003 is a boot ROM for storing a boot program of the copying machine. A HDD 2004 is a hard disk drive for storing software (or program), image data or the like.

An operation unit I/F 2006 is an interface unit with an operation unit (UI) 2012 having a touch panel, and outputs data to be displayed in the operation unit 2012 to the same. The operation unit I/F 2006 serves to transmit information which a user of the copying machine has input using the operation unit 2012 to the CPU 2001. A network I/F 2010 connects the copying machine to the LAN 2011 to input/output information. A modem 2050 connects the copying machine to the public line 2051 to input/output information. The above units are arranged on a system bus 2007.

An image bus I/F 2005 is a bus bridge for connecting the system bus 2007 to an image bus 2008 for transferring image data at a high speed to convert a data structure. The image bus 2008 can be a PCI bus or an IEEE 1394, and devices below are arranged on the image bus 2008.

A raster image processor (RIP) 2060 rasterizes PDL data in bitmap image data. A device I/F unit 2020 connects the scanner 2070 and/or the printer 2095 which is an image input/output device to the controller 2000 to convert the image data between a synchronous system and an asynchronous system. A scanner image processing unit 2080 corrects, processes, or edits the input image data. A printer image processing unit 2090 corrects the printer, changes resolution or the like for the image data to be printed. An image rotation unit 2030 rotates the image data. An image compression unit 2040 executes compression/decompression processing of a joint photographic experts group (JPEG) for multivalued image data, and compression/decompression processing of a joint bi-level image experts group (JBIG), modified modified read (MMR), modified Huffman (MH) or the like for binary image data. An IC card slot 2100 is allowed to input/output a key used for encryption/decryption by receiving a personal identifier number (PIN) code after insertion of an IC card medium. An encryption/decryption processing unit 2110 is a hardware accelerator board for executing data encryption/decryption processing using the key of the IC card slot 2100.

FIG. 4 shows an exemplary hardware configuration of the setting information distribution device. A CPU 4001 is a controller for controlling the entire setting information distribution device. A RAM 4002 is a work memory used when the CPU 4001 operates. A ROM 4005 is a boot ROM for storing a boot program of the setting information distribution device. A HDD 4006 is a hard disk drive for storing software (or program), image data or the like.

An operation unit I/F 4003 is an interface unit with an operation unit (UI) 4007 equipped with a keyboard, a mouse and a display 4007, and outputs data to be displayed in the operation unit 4007 to the same. The operation unit I/F 4003 serves to transmit information which the user of the setting information distribution device has input using the operation unit 4007 to the CPU 4001. A network I/F 4004 connects the setting information device to a LAN to input/output information. The aforementioned units are arranged on a system bus 4008.

Figure 3:
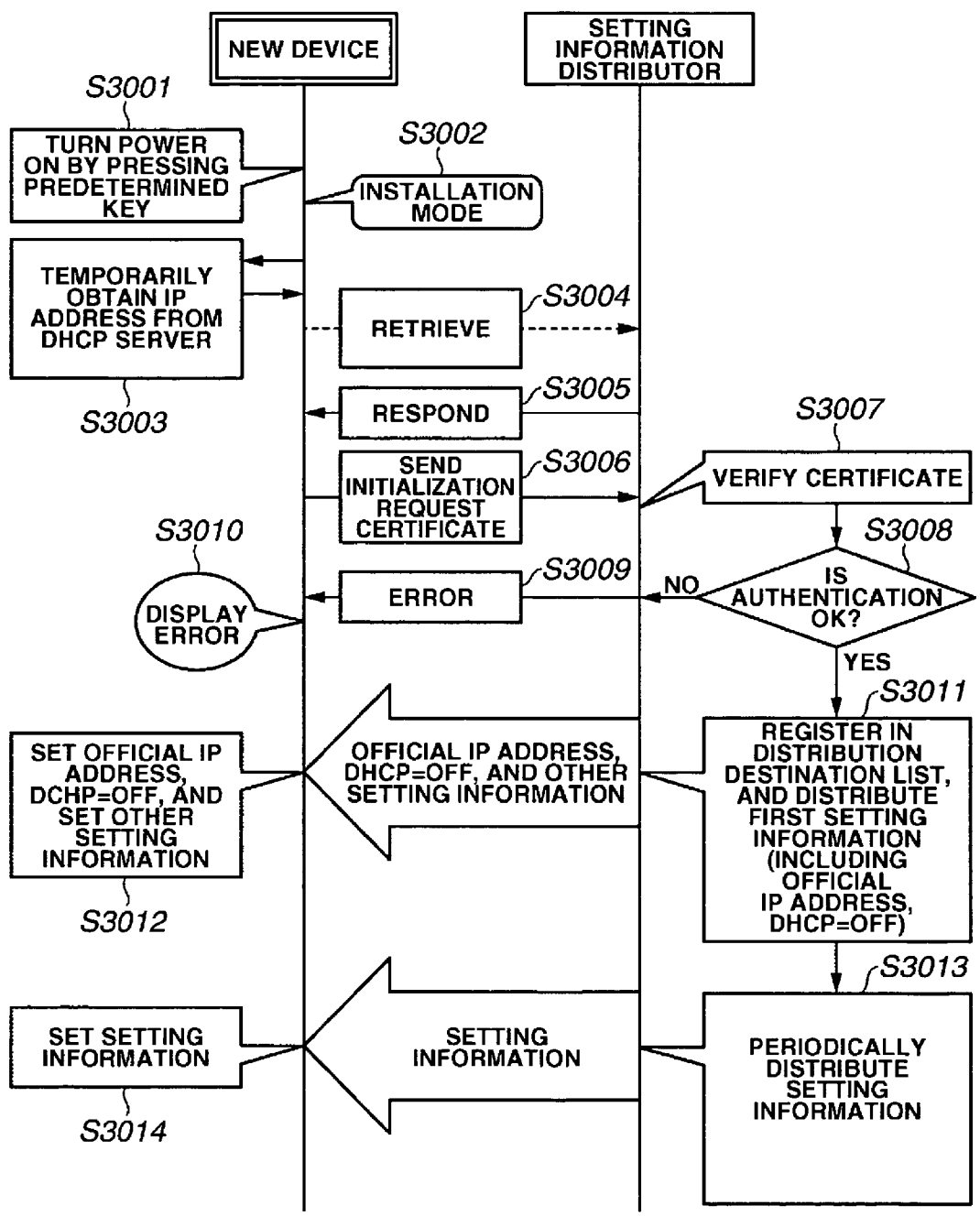
FIG. 3 is a flowchart showing an example of a process executed when a new device is connected to a network for the first time, according to an aspect of the present invention.

FIG. 3 shows a flowchart which provides an example of a process executed when a new device such as the copying machine 1001 or 1002 is connected to the Ethernet (registered trademark) 1008 for the first time. The CPU 2001 and the CPU 4001 execute programs based on the flowchart of FIG. 3 to perform this process.

Initially, the user turns power ON by pressing a specific key on an operation panel of the new device (e.g., copying machine 1001 of FIG. 1) (S3001). The new device is started in a first installation mode which is a mode when it is connected (or installed) to the network for the first time (S3002).

The new device obtains a temporary IP address from the DHCP server 1010 by a method such as DHCP through the network, and sets the temporary IP address in itself to start an operation (S3003). Thus, the new device can communicate with the setting information distribution device or the like by obtaining the temporary IP address and setting it in itself as described below.

The new device transmits data for retrieval through the network to the setting information distribution device (e.g., in FIG. 1, database/mail server 1004) by using a communication method such as service location protocol) (S3004) The setting information distribution device transmits, to the new device, a response to the data sent by the new device (from S3004) for retrieval (S3005).

The new device transmits an initialization request and a certificate to the setting information distribution device discovered by the retrieval (setting information distribution device which has transmitted the response (S3006)). For example, the certificate can be a public key electronic certificate (e.g., a public key electronic certificate in the ITU (International Telecommunication) standard X.509).

The setting information distribution device verifies the received certificate using a certificate authority (CA) certificate prepared beforehand (S3007). Then, the setting information distribution device determines whether the received certificate is legitimate (acceptable) or not based on a result of the verification (S3008).

If it is determined as a result of the verification that the received certificate is not legitimate, the process proceeds to S3009. If it is determined as a result of the verification that the received certificate is legitimate, the process proceeds to S3011.

If the received certificate is not legitimate, the setting information distribution device notifies an error to the new device (S3009). Upon reception of the error notification, the new device displays the error in the operation panel and finishes the operation (S3010).

If the received certificate is legitimate, the setting information distribution device registers information for identifying the new device in a distribution destination list stored and held in a memory, for example, in a hard disk to register the new device as a new distribution destination of setting information (S3011).

Concurrently, the setting information distribution device distributes first setting information to the new device (S3011). The first setting information contains authentic network setting information (IP address or the like) used by the new device from here on (the authentic network setting information is a formal network setting information which the new device uses in communication), and setting information for turning OFF or inhibiting the DHCP function (or functions concerning DHCP). In addition, for example, the setting information contains address book information indicating a mail address or a FAX number as a data destination address, transfer setting information indicating a transfer destination or transfer conditions when received data is transferred to others, a section ID, and the like.

The authentic network setting information to be used by the new device is managed by the setting information distribution device, and a set value unique to each device is distributed as network setting information. The information registered in the distribution destination list to identify the new device is, for example, a name of the new device, an authentic IP address transmitted to the new device, or the like.

The new device receives the first setting information to store the setting information (containing network setting information) in a memory, such as the HDD 2004 or the like. Subsequently, the new device sets setting information in itself and starts an operation (S3012). In other words, the new device sets an IP address or the like distributed from the setting information distribution device in itself, turns OFF and/or inhibits the function of the DHCP, and sets setting information other than network setting information in itself and starts an operation. The processing at S3012 enables the new device to automatically set proper network setting information (e.g., IP address or the like).

As compared with manual setting, less time and labor are required for setting, and setting mistakes can be prevented and/or reduced. Further, it is possible to automatically set setting information other than the network setting information (e.g., address book information indicating a mail address or a FAX number as a data destination address, transfer setting information indicating a transfer destination or transfer conditions when received data is transferred to others, section ID, or the like). Moreover, by turning OFF the function of the DHCP, it is possible to prevent assignment of a different IP address to the new device by the DHCP function.

Next, the setting information distribution device proceeds to periodic distribution processing of setting information (S3013). In the periodic distribution processing of the setting information, the setting information distribution device does not include the network setting information (IP address of device) or setting information for turning OFF the DHCP function in setting information to be distributed. The setting information distribution device distributes setting information to a device registered in the distribution destination list. The setting information distribution device executes the periodic distribution setting of the setting information at predetermined time intervals.

The new device sets the distributed setting information in a device (S3014). Through the processing of S3013 and S3104, setting information other than the network setting information (e.g., address book information indicating a mail address or a FAX number as a data destination address, transfer setting information indicating a transfer destination or transfer conditions when received data is transferred to others, section ID, or the like) can be continuously set, and the correct setting can be executed. Especially, when many devices (or copying machines or the like) are connected, it is possible to properly update setting information to be set in each of the devices.

As described above, according to the present invention, it is possible to efficiently set setting information to be set in the device when the new device is connected to the network.

Other Exemplary Embodiments

The preferred exemplary embodiment has been described. However, the invention is not limited to the embodiment. Various changes and modifications can be made within the scope and spirit of the invention described in appended claims.

For example, the embodiment has been described by taking the example of the copying machine. However, any device such as a printer, a digital multifunction machine, a facsimile, or a PC that is newly connected to the network, can be used as long as it can be connected to the network and setting is necessary.

When the IP address obtained by the new device in S3003 is directly used, the setting information distribution device transmits the setting information for forcibly turning OFF the function of the DHCP in S3011. However, it is not necessary to transmit the network setting information.

When the copying machine 1001 or 1002 serves as a setting information distribution device, the copying machine 1001 or 1002 transmits address book information or transfer setting information set in itself as setting information. Thus, pieces of address book information or transfer setting information set in a plurality of copying machines are synchronized with one another.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2005-168501 filed Jun. 8, 2005, and 2006-128475, filed May 2, 2006 which are hereby incorporated by reference herein in its entirety.

What is claimed is:

1. A system comprising an apparatus in communication with a device via a network, the system further comprising:
   the apparatus including a setting information transmission unit configured to transmit setting information to the device, the setting information containing a formal address to be set in the device; and
   the device including,
      an address obtaining unit configured to obtain, by using DHCP function, a temporary address used for network communication through the network;
      a setting information reception unit configured to receive from the apparatus the setting information containing the formal address;
      a setting unit configured to selectively set either one of the temporary address obtained by the address obtaining unit by using the DHCP function and the formal address contained in the received setting information; and
      a stopping unit configured to stop using the DHCP function in response to the setting unit setting the formal address contained in the received setting information as an address of the device;
   wherein, the apparatus further including,
      a storage unit configured to store an address list indicating a destination address of the setting information;
      a request reception unit configured to receive a request of the setting information from the device; and
      an addition unit configured to add the device which requests the setting information to the address list,
      wherein the setting information transmission unit transmits the setting information to the destination address indicated by the address list;
      wherein the apparatus periodically transmits setting information which does not contain the formal address, after the setting information transmission unit transmits the setting information containing the formal address.

2. A method for setting a device which has an address obtaining unit configured to obtain, by using DHCP function, a temporary address used for network communication through a network, the method comprising:
   receiving setting information containing a formal address to be set in the device;
   setting selectively either one of the temporary address obtained by the address obtaining unit by using the DHCP function and the formal address contained in the received setting information; and
   stopping using the DHCP function in response to setting the formal address contained in the received setting information as an address of the device;
   wherein, the method further comprising,
   storing an address list indicating a destination address of the setting information;
   receiving a request of the setting information from the device; and
   adding the device which requests the setting information to the address list,
   wherein the setting information transmission unit transmits the setting information to the destination address indicated by the address list;
   wherein the device periodically transmits setting information which does not contain the formal address, after the setting information transmission unit transmits the setting information containing the formal address.

3. A non-transitory storage medium containing computer-executable instructions for setting a device which has an address obtaining unit configured to obtain, by using DHCP function, a temporary address used for network communication through a network, the computer readable medium comprising:
   computer-executable instructions for receiving setting information containing a formal address to be set in the device;
   computer-executable instructions for setting selectively either one of the temporary address obtained by the address obtaining unit by using the DHCP function and the formal address contained in the received setting information; and
   stopping using the DHCP function in response to setting the formal address contained in the received setting information as an address of the device;
   wherein, the device further including,
   a storage unit configured to store an address list indicating a destination address of the setting information;
   a request reception unit configured to receive a request of the setting information from the device; and
   an addition unit configured to add the device which requests the setting information to the address list,
   wherein the setting information transmission unit transmits the setting information to the destination address indicated by the address list;
   wherein the device periodically transmits setting information which does not contain the formal address, after the setting information transmission unit transmits the setting information containing the formal address.

4. A device in communication with an apparatus via a network, the device comprising:
- an address obtaining unit configured to obtain, by using DHCP function, a temporary address used for network communication through the network;
- a setting information reception unit configured to receive from the apparatus the setting information containing a formal address to be set in the device;
- a setting unit configured to selectively set either one of the temporary address obtained by the address obtaining unit by using the DHCP function and the formal address contained in the received setting information; and
- a stopping unit configured to stop using the DHCP function in response to the setting unit setting the formal address contained in the received setting information as an address of the device;

wherein, the apparatus further including,
- a storage unit configured to store an address list indicating a destination address of the setting information;
- a request reception unit configured to receive a request of the setting information from the device; and
- an addition unit configured to add the device which requests the setting information to the address list, wherein the setting information transmission unit transmits the setting information to the destination address indicated by the address list;

wherein the apparatus periodically transmits setting information which does not contain the formal address, after the setting information transmission unit transmits the setting information containing the formal address.

* * * * *